United States Patent
Jun et al.

(10) Patent No.: US 10,437,546 B2
(45) Date of Patent: Oct. 8, 2019

(54) DISPLAY APPARATUS AND METHOD OF DRIVING THE SAME

(71) Applicant: Samsung Display Co., Ltd., Yongin-Si, Gyeonggi-Do (KR)

(72) Inventors: Tae-Jong Jun, Suwon-si (KR); Sanghyun Lee, Yongin-si (KR); Jinseob Byun, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/846,698

(22) Filed: Dec. 19, 2017

(65) Prior Publication Data

US 2019/0019474 A1    Jan. 17, 2019

(30) Foreign Application Priority Data

Jul. 17, 2017 (KR) .................. 10-2017-0090516

(51) Int. Cl.
G06F 3/14      (2006.01)
G09G 3/20      (2006.01)
G09G 3/36      (2006.01)

(52) U.S. Cl.
CPC ............. G06F 3/1446 (2013.01); G09G 3/20 (2013.01); G09G 3/3607 (2013.01);
(Continued)

(58) Field of Classification Search
CPC ...... G06F 3/1446; G09G 3/20; G09G 3/3607; G09G 2300/0452; G09G 2320/0233;
(Continued)

(56) References Cited

U.S. PATENT DOCUMENTS 6,310,650 B1 *  10/2001  Johnson .................. H04N 9/12
                                                  348/189
6,317,157 B1 *  11/2001  Takayama .............. G09G 1/167
                                                  348/254
(Continued)

FOREIGN PATENT DOCUMENTS

KR    1020170026878 A    3/2017

*Primary Examiner* — Michael J Jansen, II
(74) *Attorney, Agent, or Firm* — Cantor Colburn LLP (57) ABSTRACT

A display apparatus includes a driver which receives an input image data (RGB), generates a compensation image data ($RGB_D$) by compensating the input image data according to an equation 1, and generates a final image data by comparing the compensation image data to a maximum grayscale $$RGB_D = RGB * D, \text{ wherein} \quad \text{(equation 1)}$$

$$D = \left(\frac{100}{\text{decreasing ratio of luminance}}\right)^{\frac{1}{\alpha}},$$

wherein $\alpha$ is a gamma value, and $$\text{decreasing ratio of luminance} = \frac{\text{real luminance}}{\text{target luminance}} * 100;$$

and a display panel which includes a plurality of unit pixels and displays an image based on the final image data.

18 Claims, 9 Drawing Sheets

(52) U.S. Cl.
CPC .......... *G09G 2300/026* (2013.01); *G09G 2300/0452* (2013.01); *G09G 2310/0232* (2013.01); *G09G 2320/02* (2013.01); *G09G 2320/0233* (2013.01); *G09G 2320/0626* (2013.01)

(58) Field of Classification Search
CPC ... G09G 2320/0626; G09G 2310/0232; G09G 2300/026; G09G 2320/02
See application file for complete search history.

(56) References Cited

U.S. PATENT DOCUMENTS

| | | | | |
|---|---|---|---|---|
| 6,384,839 B1* | 5/2002 | Paul | | G06T 11/203 345/613 |
| 7,345,666 B2* | 3/2008 | Kubo | | G09G 3/3648 345/100 |
| 7,460,103 B2* | 12/2008 | Konno | | G09G 3/3426 345/102 |
| 7,656,372 B2* | 2/2010 | Sato | | G09G 3/3648 345/87 |
| 7,705,810 B2* | 4/2010 | Choi | | G09G 3/3225 315/169.3 |
| 7,932,915 B2* | 4/2011 | Miyata | | G09G 3/3611 345/690 |
| 7,956,876 B2* | 6/2011 | Shiomi | | G09G 3/3648 345/690 |
| 8,035,589 B2* | 10/2011 | Shiomi | | G09G 3/3648 345/87 |
| 8,203,582 B2* | 6/2012 | Elliott | | G09G 3/3406 345/589 |
| 8,223,180 B2* | 7/2012 | Elliott | | G09G 3/3406 345/214 |
| 8,325,128 B2* | 12/2012 | Katayama | | G09G 3/3406 345/101 |
| 8,405,672 B2* | 3/2013 | Han | | G09G 5/02 345/589 |
| 8,681,189 B2* | 3/2014 | Wallener | | G09G 3/3426 345/102 |
| 8,711,136 B2* | 4/2014 | Park | | G09G 3/3233 345/204 |
| 8,952,881 B2* | 2/2015 | Nonaka | | G09G 3/342 345/102 |
| 9,024,980 B2* | 5/2015 | Lin | | G09G 3/3208 345/589 |
| 9,128,298 B2* | 9/2015 | Shiomi | | G02B 27/26 |
| 9,183,796 B2* | 11/2015 | Lin | | G09G 3/36 |
| 9,251,752 B2* | 2/2016 | Seo | | G09G 3/3648 |
| 9,460,651 B2* | 10/2016 | Chun | | G09G 3/3208 |
| 9,818,333 B2* | 11/2017 | Li | | H04N 1/60 |
| 9,966,022 B2* | 5/2018 | Cao | | G09G 3/3607 |
| 10,007,136 B2* | 6/2018 | Jung | | G02F 1/133308 |
| 2004/0222999 A1* | 11/2004 | Choi | | G09G 3/3225 345/589 |
| 2005/0122296 A1* | 6/2005 | Kubo | | G09G 3/3648 345/89 |
| 2005/0184944 A1* | 8/2005 | Miyata | | G09G 3/3611 345/89 |
| 2005/0184952 A1* | 8/2005 | Konno | | G09G 3/3426 345/102 |
| 2005/0184980 A1* | 8/2005 | Sato | | G09G 3/3648 345/204 |
| 2008/0129762 A1* | 6/2008 | Shiomi | | G09G 3/3648 345/690 |
| 2008/0158443 A1* | 7/2008 | Shiomi | | G09G 3/3648 348/790 |
| 2009/0015532 A1* | 1/2009 | Katayama | | G09G 3/3406 345/89 |
| 2011/0043533 A1* | 2/2011 | Han | | G09G 5/02 345/589 |
| 2011/0043552 A1* | 2/2011 | Brown Elliott | | G09G 3/3406 345/694 |
| 2011/0043553 A1* | 2/2011 | Brown Elliott | | G09G 3/3406 345/694 |
| 2011/0169881 A1* | 7/2011 | Wallener | | G09G 3/3426 345/690 |
| 2012/0056918 A1* | 3/2012 | Nonaka | | G09G 3/342 345/694 |
| 2013/0033588 A1* | 2/2013 | Shiomi | | G02B 27/26 348/58 |
| 2013/0135272 A1* | 5/2013 | Park | | G09G 3/3233 345/211 |
| 2013/0342585 A1* | 12/2013 | Chun | | G09G 3/3208 345/690 |
| 2014/0022271 A1* | 1/2014 | Lin | | G09G 3/36 345/589 |
| 2014/0267442 A1* | 9/2014 | Lin | | G09G 3/3208 345/690 |
| 2014/0320552 A1* | 10/2014 | Seo | | G09G 3/3648 345/690 |
| 2016/0342015 A1* | 11/2016 | Jung | | G02F 1/133308 |
| 2017/0169773 A1* | 6/2017 | Cao | | G09G 3/3607 |
| 2017/0200405 A1* | 7/2017 | Li | | H04N 1/60 |
| 2018/0137795 A1* | 5/2018 | Chaji | | G09G 3/006 |
| 2018/0139429 A1* | 5/2018 | Park | | H04N 9/77 |
| 2018/0143498 A1* | 5/2018 | Walker | | G02F 1/133753 |
| 2018/0144710 A1* | 5/2018 | Walker | | G02F 1/133753 |
| 2018/0204522 A1* | 7/2018 | Furihata | | G09G 3/3275 |

* cited by examiner

| Model | BZW | P_BZW(As-Is) | P_BZW | P_BZW(Ideal) |
|---|---|---|---|---|
| A | 2.30mm | 3.28mm | 2.76mm | 2.33mm |
| B | 1.49mm | 2.68mm | 1.95mm | 1.48mm |

DISPLAY APPARATUS AND METHOD OF DRIVING THE SAME

This application claims priority to Korean Patent Application No. 10-2017-0090516, filed on Jul. 17, 2017, and all the benefits accruing therefrom under 35 U.S.C. § 119, the content of which in its entirety is herein incorporated by reference.

BACKGROUND

1. Field

Exemplary embodiments of the inventive concept relate to a display apparatus. More particularly, exemplary embodiments of the inventive concept relate to a display apparatus and a method of driving the display apparatus.

2. Description of the Related Art

A display apparatus, such as a liquid crystal display ("LCD") apparatus and an organic light emitting display apparatus, includes a display panel and a panel driver. The display panel includes a plurality of gate lines, a plurality of data lines and a plurality of pixels connected to the gate lines and the data lines. A panel driver includes a gate driver providing gate signals to the gate lines and a data driver providing data voltages to the data lines.

In general, the LCD apparatus includes a first substrate including a pixel electrode, a second substrate including a common electrode and a liquid crystal layer disposed between the first and second substrate. An electric field is generated by voltages applied to the pixel electrode and the common electrode. By adjusting an intensity of the electric field, a transmittance of a light passing through the liquid crystal layer may be adjusted such that a desired image may be displayed.

The organic light emitting display apparatus displays images using organic light emitting diodes ("OLEDs"). The OLED generally includes an organic layer between two electrodes, i.e., an anode and a cathode. Holes from the anode may be combined with electrons from the cathode in the organic layer between the anode and the cathode to emit light.

A tiled display apparatus is used as a big display apparatus by integrating a plurality of display apparatuses for displaying an ultra-high resolution image. The tiled display apparatus includes bezels disposed between the plurality of display apparatuses.

SUMMARY

Exemplary embodiments of the inventive concept direct to a display apparatus capable of improving display quality.

Exemplary embodiments of the inventive concept provide another display apparatus capable of improving display quality.

Exemplary embodiments of the inventive concept provide a method of driving the display apparatus.

Exemplary embodiments of the inventive concept provide another method of driving the display apparatus.

According to an exemplary embodiment of the inventive concept, a display apparatus includes a driver which receives an input image data (RGB), generates a compensation image data ($RGB_D$) by compensating the input image data according to an equation 1, and generates a final image data by comparing the compensation image data to a maximum grayscale, $$RGB_D = RGB * D, \text{ wherein} \qquad \text{(equation 1)}$$

$$D = \left(\frac{100}{\text{decreasing ratio of luminance}}\right)^{\frac{1}{\alpha}},$$

wherein $\alpha$ is a gamma value, and $$\text{decreasing ratio of luminance} = \frac{\text{real luminance}}{\text{target luminance}} * 100,$$

and a display panel which includes a plurality of unit pixels and displays an image based on the final image data.

In an exemplary embodiment, the decreasing ratio of luminance may decrease toward an edge of the display panel In an exemplary embodiment, the decreasing ratio of luminance varies depending on a corresponding unit pixel of the plurality of unit pixels In an exemplary embodiment, the decreasing ratios of luminance for sub-pixels included in the unit pixel may be the same.

In an exemplary embodiment, the driver may determine whether the highest grayscale of a red grayscale, a green grayscale, and a blue grayscale of the compensation image data is greater than the maximum grayscale, may generate the final image data by multiplying each of the grayscales of the compensation image data by the maximum grayscale and dividing each of the grayscales of the compensation image data by the highest grayscale when the highest grayscale is greater than the maximum grayscale, and may provide the compensation image data as the final image data when the highest grayscale is equal to or less than the maximum grayscale.

In an exemplary embodiment, the decreasing ratios of luminance for sub-pixels included in the unit pixel may be different from each other.

In an exemplary embodiment, the driver may determine whether the compensation image data corresponding to each of sub-pixels included in the unit pixel is greater than the maximum grayscale, generates the final image data, corresponding to a first sub-pixel included in the unit pixel, having the maximum grayscale when the compensation image data corresponding to the first sub-pixel is greater than the maximum grayscale, and provides the compensation image data corresponding to a second sub-pixel included in the unit pixel as the final image data corresponding to the second sub-pixel when the compensation image data corresponding to the first sub-pixel is equal or less than the maximum grayscale.

In an exemplary embodiment, the unit pixels disposed in an outermost of the display panel may be white unit pixels that include white sub-pixels.

In an exemplary embodiment, when remainder unit pixels of the plurality of unit pixels may be general unit pixels that include red, green, and blue sub-pixels.

In an exemplary embodiment, the driver may compensate a grayscale of the input image data corresponding to the white unit pixels to decrease the grayscale of the input image data.

In an exemplary embodiment, the driver may compensate the input image data corresponding to the white unit pixel based on a decreasing ratio of luminance of the white unit pixel to emit a target luminance of the general unit pixel corresponding to the white unit pixel.

In an exemplary embodiment, the maximum grayscale may be 255 grayscale.

In an exemplary embodiment, the input image data may be a red grayscale, a green grayscale, and a blue grayscale corresponding to the unit pixel.

According to an exemplary embodiment of the inventive concept, a display apparatus includes a plurality of partial display devices. Each of the partial display devices includes a driver which receives an input image data (RGB), generate a compensation image data (RGB$_D$) by compensating the input image data according to an equation 2, and generate a final image data by comparing the compensation image data to a maximum grayscale, $$RGB_D = RGB * D, \text{ wherein} \quad \text{(equation 2)}$$
$$D = \left(\frac{100}{\text{decreasing ratio of luminance}}\right)^{\frac{1}{\alpha}},$$
wherein $\alpha$ is a gamma value, and
$$\text{decreasing ratio of luminance} = \frac{\text{real luminance}}{\text{target luminance}} * 100,$$

and a partial display panel which displays an image based on the final image data. Screens of the partial display panel are arranged in a tile shape and bezels are disposed between the screens.

According to an exemplary embodiment of the inventive concept, a method of driving a display apparatus includes receiving an input image data (RGB), generating a compensation image data (RGB$_D$) by compensating the input image data based on an equation 3, $$RGB_D = RGB * D, \text{ wherein} \quad \text{(equation 3)}$$
$$D = \left(\frac{100}{\text{decreasing ratio of luminance}}\right)^{\frac{1}{\alpha}},$$
wherein $\alpha$ is a gamma value, and
$$\text{decreasing ratio of luminance} = \frac{\text{real luminance}}{\text{target luminance}} * 100,$$

generating a final image data by comparing the compensation image data to a maximum grayscale, and displaying an image based on the final image data.

In an exemplary embodiment, the display apparatus may include a plurality of unit pixels, and the decreasing ratios of luminance corresponding to the unit pixels may be different from each other.

According to an exemplary embodiment of the inventive concept, a display apparatus includes a display panel which includes white unit pixels having white sub-pixels and general unit pixels having red, green, and blue sub-pixels, wherein the white unit pixels are disposed in outermost, wherein the general unit pixels are disposed in remainder part except the outermost, and driver which compensates an input image data corresponding to the white unit pixels to decrease the grayscale of the input image data.

In an exemplary embodiment, the driver compensates the input image data corresponding to the general unit pixels in order to compensate a luminance decrease of the general unit pixels.

According to the inventive concept, a display apparatus and a method of driving the same may improve a phenomenon of luminance decrease in an edge of the display panel by compensating image data, considering a decreasing ratio of luminance of the edge of the display panel. Further, the phenomenon of luminance decrease may improve in the event that a maximum grayscale is displayed by substituting the outermost pixels for white sub-pixels. Therefore, display quality may improve because a bezel width perceived by a user decreases.

BRIEF DESCRIPTION OF THE DRAWINGS

The above and other features and advantages of the inventive concept will become more apparent by describing detailed exemplary embodiments thereof with reference to the accompanying drawings, in which.

DETAILED DESCRIPTION

Hereinafter, the present inventive concept will be explained in detail with reference to the accompanying drawings.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
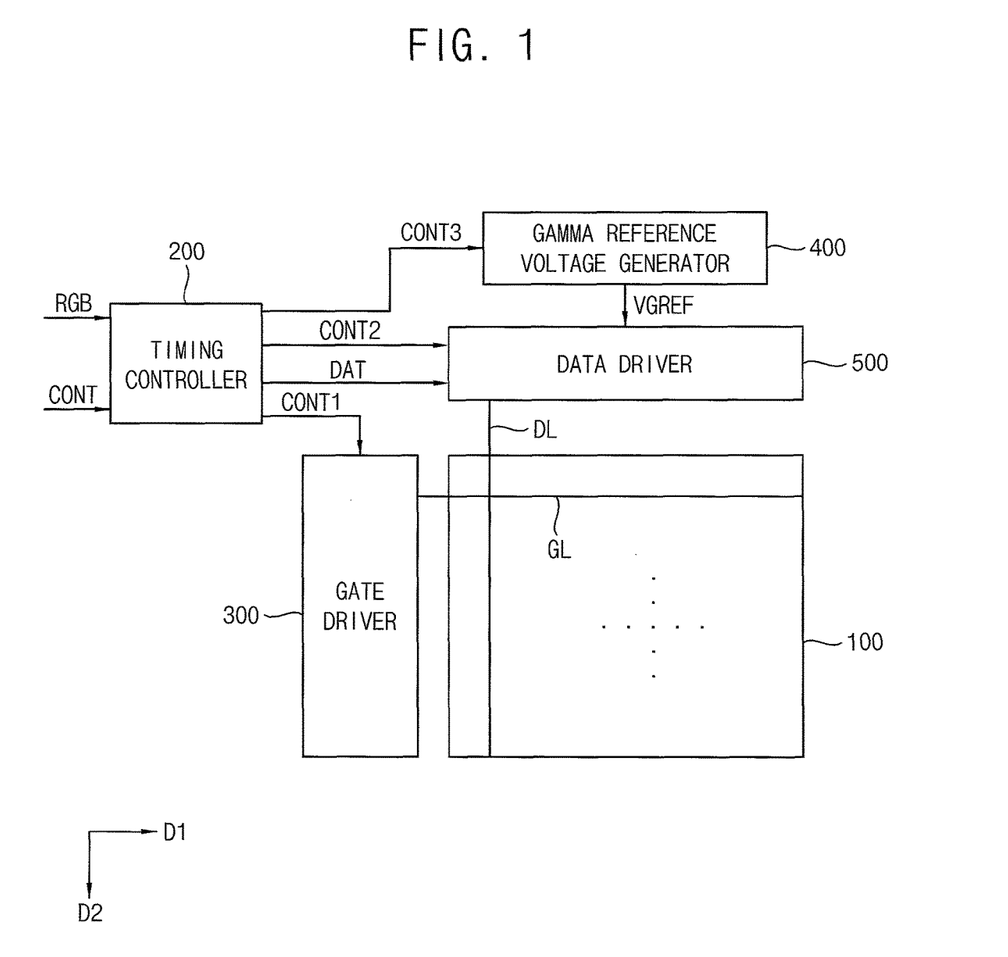
FIG. 1 is a block diagram illustrating an exemplary embodiment of a display apparatus according to the inventive concept.

FIG. 1 is a block diagram illustrating an exemplary embodiment of a display apparatus according to the inventive concept.

Referring to FIG. 1, a display apparatus may include a display panel and a driver. The driver may include a timing controller 200, a gate driver 300, a gamma reference voltage generator 400, and a data driver 500.

The display panel 100 may include a display area that displays an image and a peripheral area disposed adjacent to the display area.

The display panel 100 may include a plurality of gate lines GL, a plurality of data lines DL, and a plurality of pixels electrically coupled to the gate lines GL and the data lines DL. The gate lines GL extend in a first direction D1 and the data lines DL extend in a second direction D2 crossing the first direction D1.

In some exemplary embodiments, the pixels may include a switching element (not shown), a liquid crystal capacitor (not shown) and a storage capacitor (not shown). The liquid crystal capacitor and the storage capacitor may be electrically connected to the switching element. The pixels may be arranged in a matrix configuration.

Each of the pixels may include a plurality of sub-pixels. In some exemplary embodiments, each of the pixels may include a red sub-pixel, a green sub-pixel, and a blue sub-pixel. In other exemplary embodiments, the pixels disposed in an edge of a display panel or a display area may include a white sub-pixel.

The structure of the pixels will be explained in detail with reference of FIGS. 3 and 9.

The timing controller 200 may receive input image data RGB and an input control signal CONT from an external device (not shown). The input image data RGB may be substantially the same as the input image signal. The input image data RGB may include red image data R, green image data G and blue image data B or may be one of the red image data R, the green image data G and the blue image data B depending on a scope of target pixel. Each of the red image data R, green image data G, and the blue image data B may have a value of 0 to 255 grayscale. The grayscale of the input image data RGB may represent (R, G, B) or one of R, G, and B. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, a third control signal CONT3, and a data signal DAT based on the input image data RGB and the input control signal CONT.

The timing controller 200 may generate the first control signal CONT1 for controlling operations of the gate driver 300 based on the input control signal CONT, and outputs the first control signal CONT1 to the gate driver 300. The first control signal CONT1 may include a vertical start signal and a gate clock signal.

The timing controller 200 may generate the second control signal CONT2 for controlling operations of the data driver 500 based on the input control signal CONT, and outputs the second control signal CONT2 to the data driver 500. The second control signal CONT2 may include a horizontal start signal and a load signal.

The timing controller 200 may generate the data signal DAT based on the input image data RGB. The timing controller 200 outputs the data signal DAT to the data driver 500. The data signal DAT may be substantially the same image data as the input image data RGB or the data signal DAT may be compensated image data generated by compensating the input image data RGB. In an exemplary embodiment, for example, the timing controller 200 may selectively perform an image quality compensation, a spot compensation, an adaptive color correction ("ACC"), and/or a dynamic capacitance compensation ("DCC") on the input image data RGB to generate the data signal DAT.

Specially, the timing controller 200 may compensate the input image data RGB in order to compensate a luminance decrease in the edge of the screen. In this case, the timing controller 200 generate data signal DAT based on the compensated input image data.

The compensation of the input image data RGB will be explained in detail with reference of FIGS. 3 through 6, 9, and 10.

The timing controller 200 may generate the third control signal CONT3 for controlling operations of the gamma reference voltage generator 400 based on the input control signal CONT, and outputs the third control signal CONT3 to the gamma reference voltage generator 400.

The gate driver 300 generates gate signals for driving the gate lines GL in response to the first control signal CONT1 received from the timing controller 200. The gate driver 300 sequentially outputs the gate signals to the gate lines GL.

In some exemplary embodiments, the gate driver 300 may be directly mounted on the display panel 100, or may be connected to the display panel 100 as a tape carrier package ("TCP") type. Alternatively, the gate driver 300 may be integrated on the peripheral region of the display panel 100.

The gamma reference voltage generator 400 may generate a gamma reference voltage VGREF in response to the third control signal CONT3 received from the timing controller 200. The gamma reference voltage generator 400 outputs the gamma reference voltage VGREF to the data driver 500. The level of the gamma reference voltage VGREF corresponds to grayscales of a plurality of pixel data included in the data signal DAT.

In some exemplary embodiments, the gamma reference voltage generator 400 may be disposed in the timing controller 200, or may be disposed in the data driver 500.

The data driver 500 may receive the second control signal CONT2 and the data signal DAT from the timing controller 200, and receives the gamma reference voltage VGREF from the gamma reference voltage generator 400. The data driver 500 converts the data signal DAT to data voltages having analogue levels based on the gamma reference voltage VGREF. The data driver 500 outputs the data voltages to the pixel electrodes connected to the data lines DL.

In some exemplary embodiments, the data driver 500 may be directly mounted on the display panel 100, or may be connected to the display panel 100 as a TCP type. Alternatively, the data driver 500 may be integrated on the peripheral region of the display panel 100.

Figure 2:
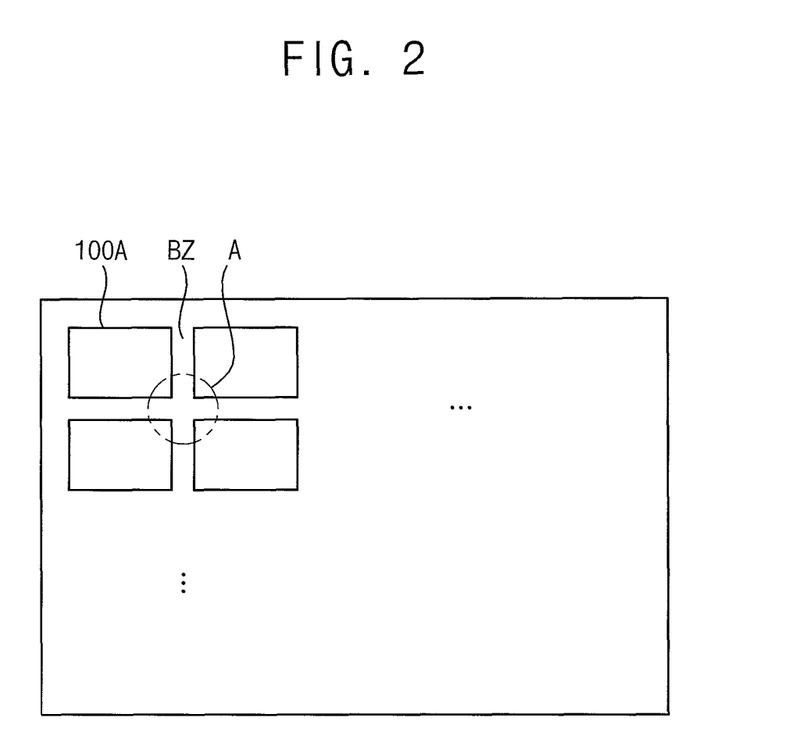
FIG. 2 is a diagram illustrating an exemplary embodiment of a screen of a tiled-display apparatus formed with the plurality of display apparatuses according to the inventive concept.

FIG. 2 is a diagram illustrating an exemplary embodiment of a screen of a tiled-display apparatus formed with a plurality of display apparatuses according to the inventive concept. The tiled display apparatus is a large display apparatus as which the plurality of display apparatuses is integrated in order to display ultra-high resolution image.

Referring to FIGS. 1 and 2, the display apparatus may be one of the display apparatus that may be included in the tiled display apparatus according to an exemplary embodiment. In this case, the display panel 100 included in the display apparatus according to an exemplary embodiment may correspond to one of a plurality of partial screens included in the tiled display apparatus. That is, the display panel 100 may be one of partial display panels 100A of the tiled display apparatus.

A bezel BZ may be disposed between the partial display panels 100A of the tiled display apparatus. The user may perceive the whole screen of the tiled display apparatus as one display apparatus. Thus, the image quality of the tiled display apparatus may improve as the bezel BZ is thinner.

Figure 3:
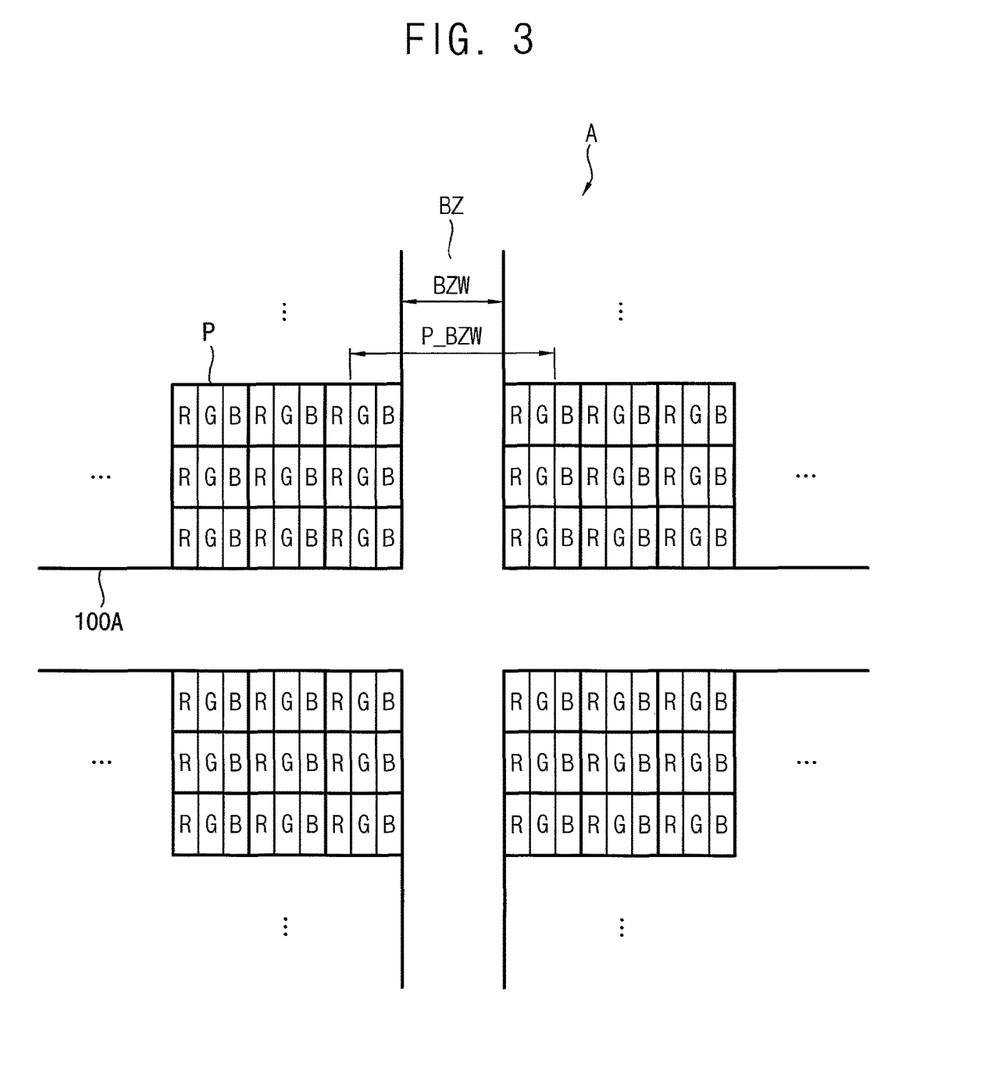
FIG. 3 is an enlarged diagram illustrating portion A of FIG. 2.

FIG. 3 is an enlarged diagram illustrating portion A of FIG. 2.

Referring to FIGS. 1 through 3, the partial display panel 100A may include a plurality of pixels. A unit pixel P may include a plurality of sub-pixels. For example, the unit pixel P may include a red sub-pixel R, a green sub-pixel G, and a blue sub-pixel B.

The other partial display panels included in the tiled display apparatus may be substantially the same as the partial display panel 100A of FIG. 3.

The bezel BZ may be a space between the partial display panels 100A. The pixels are not disposed in the bezel BZ. That is, the image may not be displayed on the bezel BZ.

A bezel width BZW is a real width of the bezel BZ. The bezel width BZW may not be changed once the tiled display apparatus is manufactured.

A perception bezel width P_BZW is a width of a space that the user perceives as the bezel. The perception bezel width P_BZW may increase as edges of the partial display panels of the tiled display apparatus are darker. In most cases, the perception bezel width P_BZW is wider than the bezel width BZW. The display quality of the tiled display apparatus may improve by decreasing the perception bezel width P_BZW. The perception bezel width P_BZW may be changed according to a property of the image displayed on the partial display panels even after the tiled display apparatus is manufactured.

In other exemplary embodiments, the display apparatus may be a single display, not part of the tiled display apparatus, although not shown.

Figure 4:
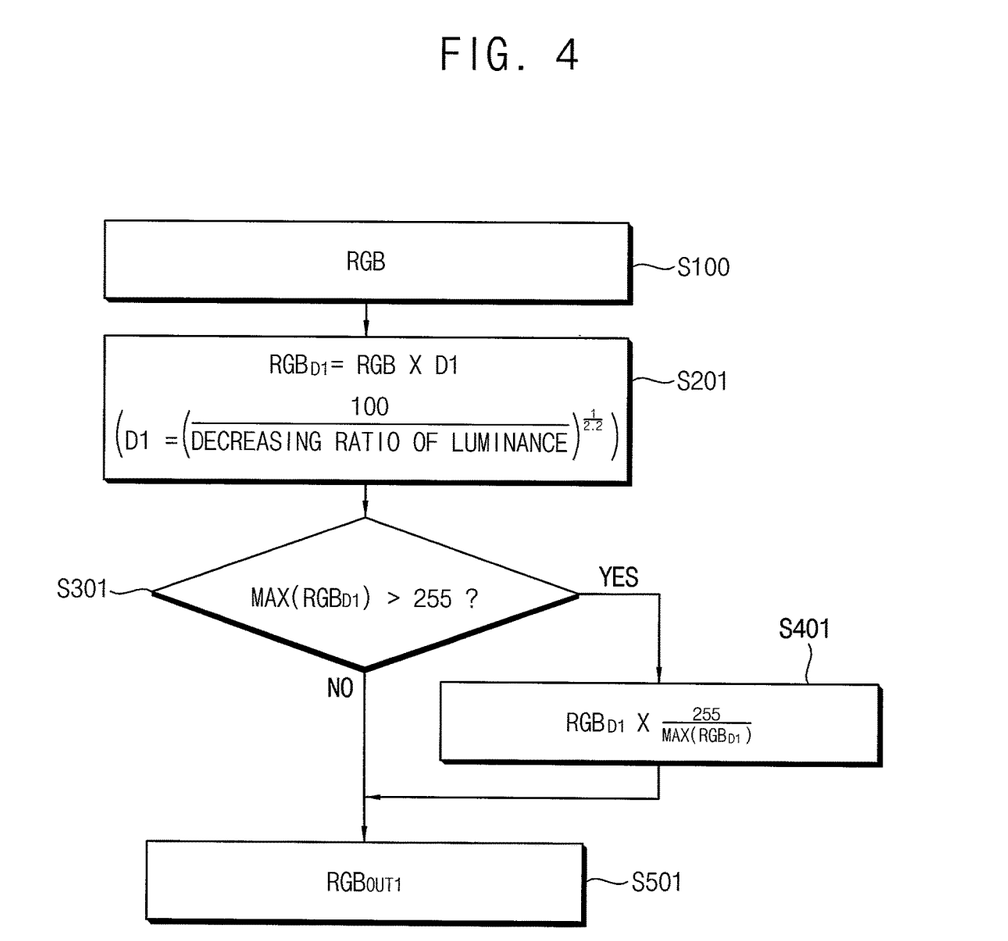
FIG. 4 is a flaw chart illustrating an exemplary embodiment of a method for compensating decrease of luminance according to the inventive concept.
Figure 5:
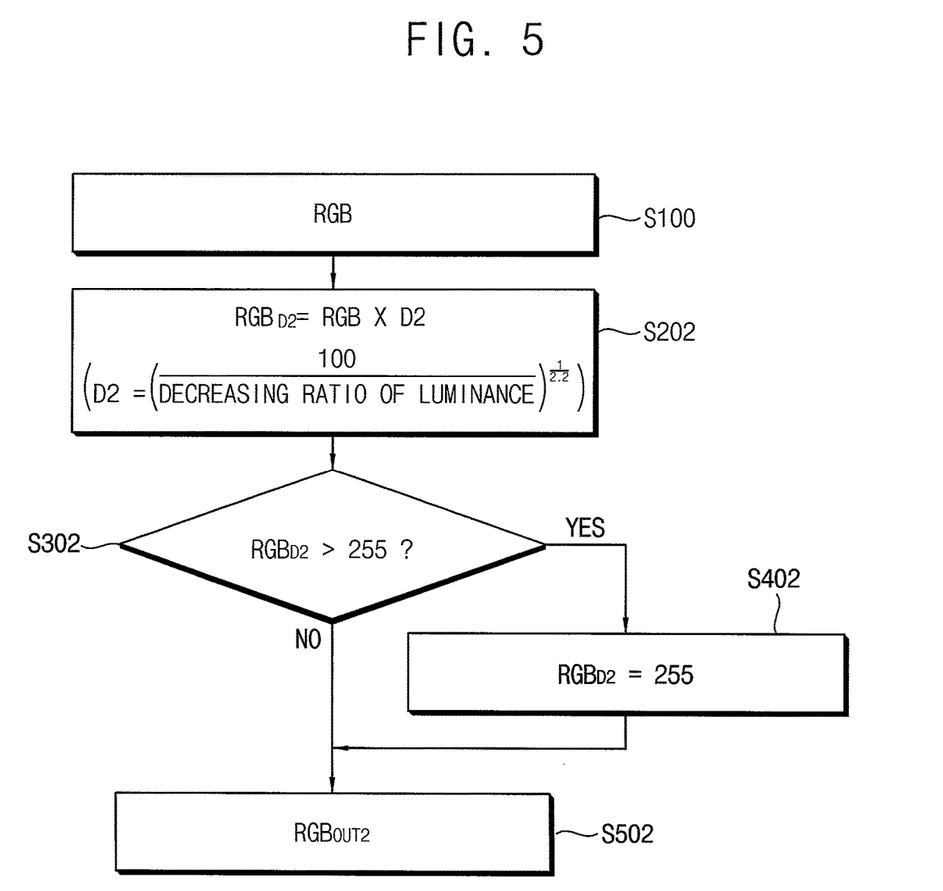
FIG. 5 is a flaw chart illustrating another exemplary embodiment of a method for compensating decrease of luminance according to the inventive concept.
Figure 6:
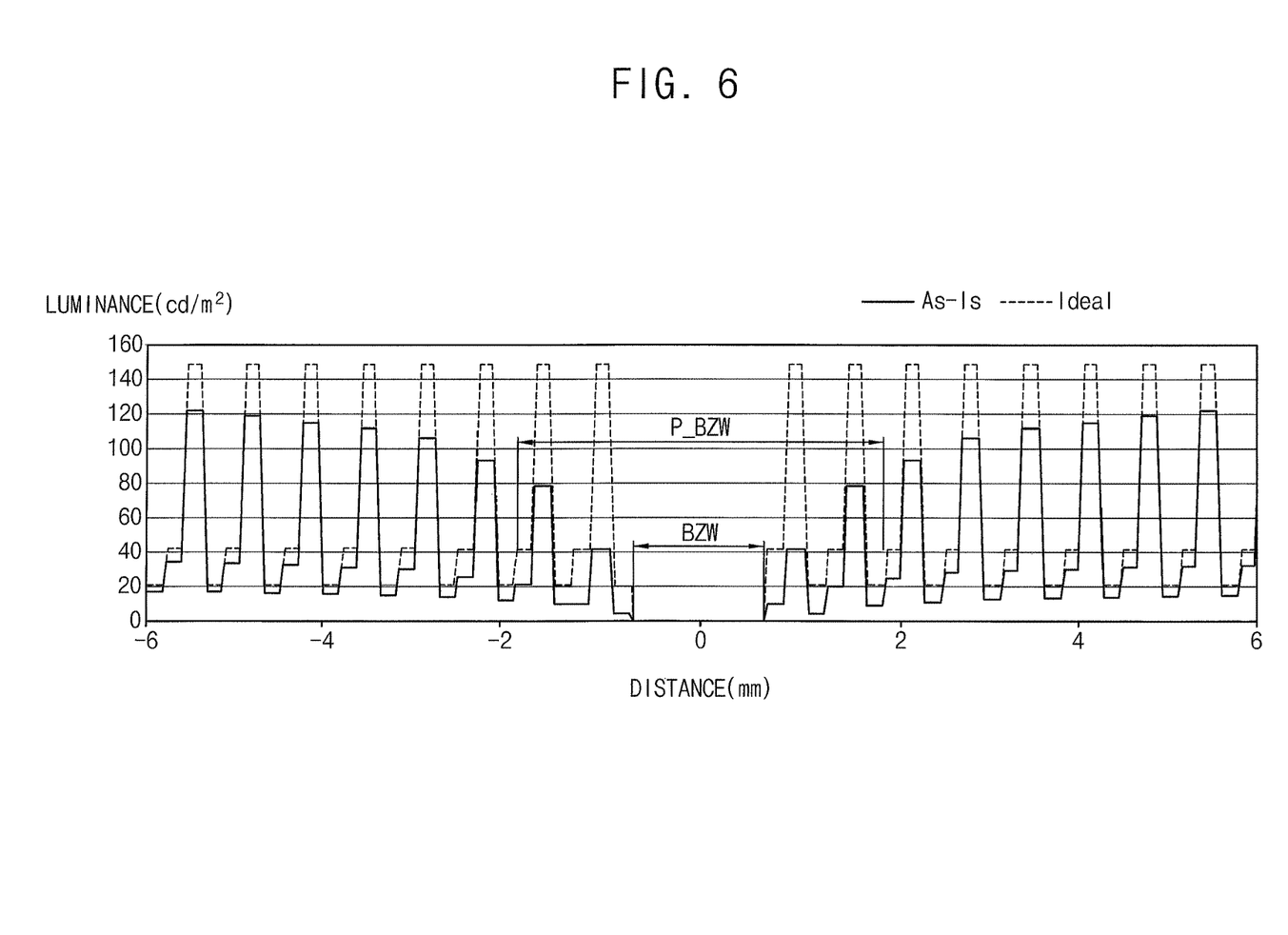
FIG. 6 is a graph describing a method for compensating decrease of luminance of FIGS. 4 and 5.

FIG. 4 is a flaw chart illustrating an exemplary embodiment of a method for compensating decrease of luminance according to the inventive concept, FIG. 5 is a flaw chart illustrating another exemplary embodiment of a method for compensating decrease of luminance according to the inventive concept, FIG. 6 is a graph for describing a method for compensating decrease of luminance of FIGS. 4 and 5.

Specifically, FIG. 6 is a graph illustrating luminance (cd/m$^2$) of pixels in edge of a partial display panel versus a distance (millimeters: mm) from a center of the bezel to calculate a decreasing ratio of luminance.

Referring to FIGS. 1 through 3 and FIG. 6, the luminance of the pixel in the edge of the partial display panel may be uniform in an ideal case (Ideal). However, the luminance of the pixel in the edge of the partial display panel decreases before applying a method for compensating decreased luminance according to an exemplary embodiment in a real case (As-Is).

The decreasing ratio of luminance is a ratio of luminance in the ideal case (target luminance) to luminance in a real case (real luminance).

That is, the decreasing ratio of luminance may satisfy an equation 1.

$$\text{decreasing ratio of luminance} = \frac{\text{real luminance}}{\text{target luminance}} * 100 \qquad \langle\text{equation 1}\rangle$$

The decreasing ratio of luminance may have a value of 0 to 100. The decreasing ratio of luminance may be dependent on the property of the partial display panel 100A. A difference of the real luminance and the target luminance increase as the decreasing ratio of luminance decreases. The decreasing ratio of luminance may decrease toward the edge of the partial display panel 100A when the method for compensating decreased luminance is not applied. Specifically, the decreasing ratios of luminance of the sub-pixels included in the same unit pixel P may be different from each other. In an exemplary embodiment, for example, the decreasing ratio of luminance of the sub-pixel disposed in the edge of the partial display panel 100A may be less than other sub-pixels not disposed in the edge of the partial display panel 100A, although the sub-pixel disposed in the edge of the partial display panel 100A and the sub-pixels disposed not disposed in the edge of the partial display panel 100A are included in the same unit pixel P.

The perception bezel width P_BZW may increase as the decreasing ratio of luminance in the edge of the partial display panel 100A decreases. That is, it is preferable to increase the decreasing ratio of luminance in the edge of the partial display panel 100A in order to improve the display quality of the display apparatus.

The decreasing ratio of luminance of the pixels in the edge of the partial display panel 100A may be stored in the timing controller 200. For example, the decreasing ratio of luminance may be stored based on the graph of FIG. 6.

Referring to FIGS. 1, 2, 3, 4, and 6, the timing controller 200 may generate the compensation image data $RGB_{D1}$ based on the input image data RGB and the corresponding decreasing ratio of luminance (S201). The decreasing ratio of luminance of all sub-pixels in the unit pixel P may be the same. The timing controller 200 may generate the compensation image data $RGB_{D1}$ using an equation 2.

$$RGB_{D1} = RGB * D1, \text{ wherein} \qquad \langle\text{equation 2}\rangle$$
$$D1 = \left(\frac{100}{\text{decreasing ratio of luminance}}\right)^{\frac{1}{\alpha}},$$

wherein α is a gamma value.

Here, the input image data RGB represents a red grayscale, a green grayscale, and a blue grayscale of the input image data RGB, and the compensation image data $RGB_{D1}$ represents a compensated red grayscale, a compensated green grayscale, and a compensated blue grayscale. Each component of the input image data RGB may be a value of 0 to 255 grayscale. In an exemplary embodiment, D1 may vary depending on a unit pixel P, and the D1 having the same value may be applied to the sub-pixels in the same unit pixel P.

For example, the timing controller 200 may receive the input image data RGB having a first red grayscale, a first green grayscale, and a first blue grayscale for a first unit pixel and may generate the compensation image data $RGB_{D1}$ having a first compensation red grayscale, a first compensation green grayscale, and a first compensation blue grayscale. The D1 having the same value may be applied to the sub-pixels included in the first unit pixel. The timing controller 200 may receive the input image data RGB having a second red grayscale, a second green grayscale, and a second blue grayscale for the second unit pixel that is different from the first unit pixel and may generate the compensation image $RGB_{D1}$ having a second compensation red grayscale, a second compensation green grayscale, and a second compensation blue grayscale. The same value D1 that is different from the D1 of the first unit pixel may be applied to the sub-pixels included in the second unit pixel.

The timing controller 200 may compare a greatest compensation grayscale MAX(RGB$_{D1}$) to 255 grayscale, where the greatest compensation grayscale MAX(RGB$_{D1}$) is the greatest value among the sub-pixels' compensation grayscales in the compensation image data RGB$_{D1}$ of the unit pixel P (S301).

When the greatest compensation grayscale MAX(RGB$_{D1}$) is greater than 255 grayscale, the timing controller 200 may compensate the compensation image data RGB$_{D1}$ of the unit pixel P using an equation 3, and the compensated result corresponds to the final image data RGB$_{OUT1}$ (S401).

$$RGB_{OUT1} = RGB_{D1} * (255/MAX(RGB_{D1})) \qquad \text{<equation 3>}$$

When the greatest compensation grayscale MAX(RGB$_{D1}$) is equal to or less than 255 grayscale, the compensation image data RGB$_{D1}$ may correspond to the final image data RGB$_{OUT1}$ without further compensation. That is, the timing controller 200 may output the compensation image data RGB$_{D1}$ as the final image data RGB$_{OUT1}$.

In an exemplary embodiment, for example, when the red grayscale of the input image data RGB of the first unit pixel is 200, the green grayscale of the input image data RGB of the first unit pixel is 150, the blue grayscale of the input image data RGB of the first unit pixel is 100, and the decreasing ratio of luminance is 50, the D1 of the first unit pixel is about 1.37. In this case, the red grayscale of the compensation image data RGB$_{D1}$ of the first unit pixel is about 274, the green grayscale of the compensation image data RGB$_{D1}$ of the first unit pixel is about 206, and the blue grayscale of the compensation image data RGB$_{D1}$ of the first unit pixel is about 137. In this case, the red grayscale of the final image data RGB$_{OUT1}$ of the first unit pixel is 255, the green grayscale of the final image data RGB$_{OUT1}$ of the first unit pixel is 192, the blue grayscale of the final image data RGB$_{OUT1}$ of the first unit pixel is 128 because the greatest compensation grayscale MAX(RGB$_{D1}$) of the first unit pixel is 274 which is greater than 255, thereby the compensation image data RGB$_{D1}$ is rescaled.

The timing controller 200 may generate the data signal DAT based on the final image data RGB$_{OUT1}$ and may output the data signal DAT to the data driver 500 (S501).

When the greatest compensation grayscale MAX(RGB$_{D1}$) in the unit pixel is greater than 255 grayscale, color distortions almost do not occur because all sub-pixels in the unit pixel are clipped in the same ratio.

Referring to FIGS. 1, 2, 3, 5, and 6, in another exemplary embodiment, the timing controller may generate the compensation image data RGB$_{D2}$ based on the input image data RGB and the corresponding decreasing ratio of luminance (S202). The decreasing ratios of luminance of sub-pixels in the same unit pixel P may be different from each other. The timing controller 200 may generate the compensation image data RGB$_{D2}$ using an equation 4.

$$RGB_{D2} = RGB * D2, \text{ wherein} \qquad \text{<equation 4>}$$

$$D2 = \left(\frac{100}{\text{decreasing ratio of luminance}}\right)^{\frac{1}{a}}$$

Here, the input image data RGB represents one of a red grayscale, a green grayscale, and a blue grayscale, and the compensation image data RGB$_{D2}$ represents one of a compensated red grayscale, a compensated green grayscale, and a compensated blue grayscale, which corresponds to the input image data RGB. The input image data RGB may have a value of 0 to 255 grayscale. In an exemplary embodiment, D2 may vary depending on a unit pixel P and a sub-pixel thereof, and the sub-pixels in the one unit pixel P may have D2 having different values.

For example, the timing controller 200 may receive the input image data RGB having one of a first red grayscale, a first green grayscale, and a first blue grayscale and may generate the compensation image data RGB$_{D2}$ having one of a first compensation red grayscale, a first compensation green grayscale, and a first compensation blue grayscale, which corresponds to the input image data RGB. D2 having the different values according to the sub-pixels may be applied to the sub-pixels included in the first unit pixel. The timing controller 200 may receive the input image data RGB having one of a second red grayscale, a second green grayscale, and a second blue grayscale and may generate the compensation image RGB$_{D2}$ having one of a second compensation red grayscale, a second compensation green grayscale, and a second compensation blue grayscale. The sub-pixels included in the second unit pixel may have the D2 having the different values.

The timing controller 200 may compare each of the compensation image data RGB$_{D2}$ of the sub-pixels to 255 grayscale (S302).

When the compensation image data RGB$_{D2}$ is greater than the 255 grayscale, the timing controller 200 may compensate the compensation image data RGB$_{D1}$ of the sub-pixel as 255 grayscale and correspond to the final image data RGB$_{OUT2}$.

For example, when the red grayscale of the input image data RGB of the first unit pixel is 200, the green grayscale of the input image data RGB of the first unit pixel is 150, the blue grayscale of the input image data RGB of the first unit pixel is 100, the decreasing ratio of luminance of the red sub-pixel is 60, the decreasing ratio of luminance of the green sub-pixel is 50, and the decreasing ratio of luminance of the blue sub-pixel is 40, the D2 of the red unit pixel is about 1.26, the D2 of the green unit pixel is about 1.37, and the D2 of the blue unit pixel is about 1.52. In this case, the red grayscale of the compensation image data RGB$_{D2}$ of the first unit pixel is about 252, the green grayscale of the compensation image data RGB$_{D2}$ of the first unit pixel is about 206, and the blue grayscale of the compensation image data RGB$_{D2}$ of the first unit pixel is about 152. In this case, the red grayscale of the final image data RGB$_{OUT2}$ of the first unit pixel is 252, the green grayscale of the final image data RGB$_{OUT2}$ of the first unit pixel is 206, the blue grayscale of the final image data RGB$_{OUT2}$ of the first unit pixel is 152.

The timing controller 200 may generate the data signal DAT based on the final image data RGB$_{OUT2}$ and may output the data signal DAT to the data driver 500 (S502).

According to the exemplary embodiment, the decrease of luminance may be compensated in detail because the difference of the decreasing ratio of the luminance of the sub-pixels in the same unit pixel according to the position is considered.

Figure 7:
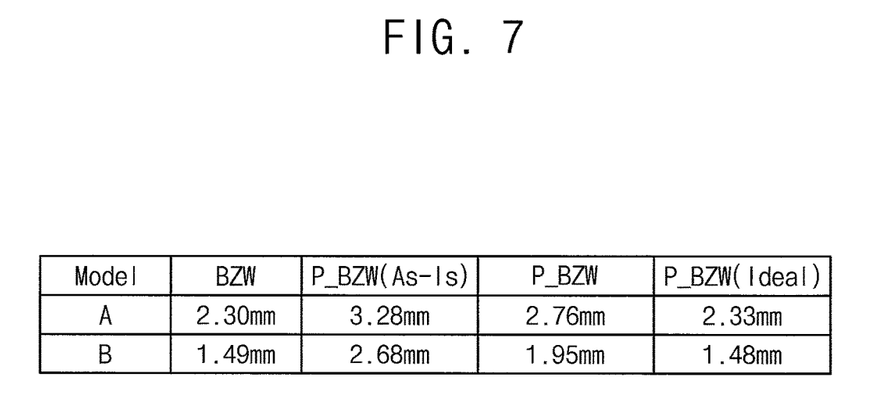
FIG. 7 is a table illustrating differences of perception bezel widths depending on whether an exemplary embodiment of a method for compensating decrease of luminance is applied to a display apparatus according to the inventive concept.

FIG. 7 is a table illustrating differences of perception bezel widths depending on whether an exemplary embodiment of a method for compensating decrease of luminance is applied to a display apparatus according to the inventive concept.

Referring to FIGS. 3 and 7, a model A is a display apparatus. A bezel width BZW of the model A is 2.30 mm, and a perception bezel width P_BZW(Ideal) of an ideal case is 2.33 mm. In a case that the exemplary embodiment of the invention is not applied, a perception bezel width P_BZW (As-Is) is 3.28 mm. In a case that the exemplary embodiment of the invention is applied, a perception bezel P_BZW is 2.76 mm. The perception bezel width decreases by 0.52 mm in the case that the exemplary embodiment of the invention is applied compared to the case that the exemplary embodiment of the invention is not applied.

A model B is a display apparatus. A bezel width BZW of the model B is 1.49 mm, and a perception bezel width P_BZW(Ideal) of an ideal case is 1.48 mm. In a case that the exemplary embodiment of the invention is not applied, a perception bezel width P_BZW(As-Is) is 2.68 mm. In a case that the exemplary embodiment of the invention is applied, a perception bezel P_BZW is 1.95 mm. The perception bezel width decreases by 0.73 mm in the case that the exemplary embodiment of the invention is applied compared to the case that the exemplary embodiment of the invention is not applied.

The luminance of the edge of the partial display panel may be compensated to be similar with the ideal luminance shown in the graph of FIG. 6 by compensating the input image data, considering the decreasing ratio of luminance of the pixels or sub-pixels in the edge of the partial display panel. Therefore, the perception bezel width may decrease.

Figure 8:
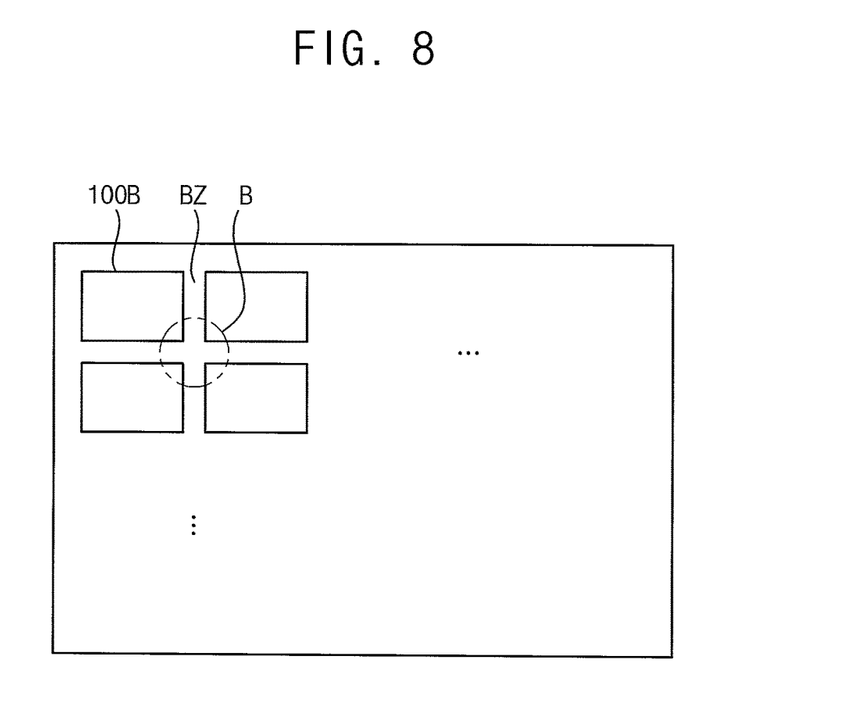
FIG. 8 is a diagram illustrating another exemplary embodiment of a screen of a tiled-display apparatus formed with a plurality of display apparatuses according to the inventive concept.

FIG. 8 is a diagram illustrating another exemplary embodiment of a screen of a tiled-display apparatus formed with a plurality of display apparatuses according to the inventive concept. FIG. 9 is an enlarged diagram illustrating portion B of FIG. 8. Hereinafter, any repetitive explanation concerning FIGS. 2 and 3 will be omitted.

Figure 9:
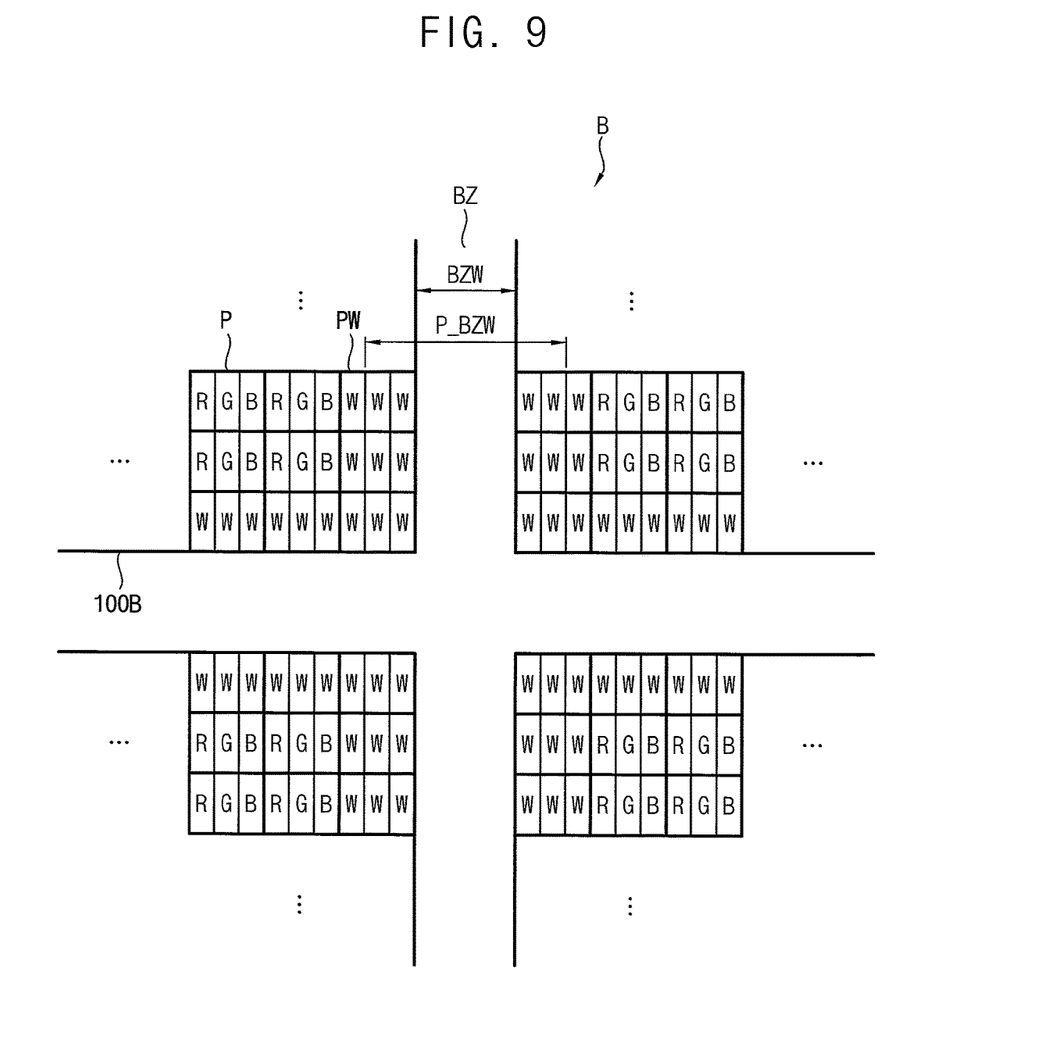
FIG. 9 is an enlarged diagram illustrating portion B of FIG. 8.

Referring to FIGS. 1, 8, and 9, the display apparatus according to the another exemplary embodiment may be one of a plurality of display apparatuses included in a tiled display apparatus. In this case, the display panel 100 included in the display apparatus according to the exemplary embodiment of FIG. 1 may correspond to one of a plurality of partial screens that include in a screen of the tiled display apparatus. That is, the display panel 100 may be one of partial display panels 100B of the tiled display apparatus.

A bezel BZ may be disposed between the partial display panels 100B of the tiled display apparatus.

The partial display panel 100B may include a plurality of pixels. White unit pixels PW may be disposed in outermost of the partial display panel 100B. That is, the pixels disposed in a first column, a last column, a first row, and a last row may be a white unit pixel PW. Unit pixels P may be disposed in remainder part except the outermost of the partial display panel 100B. The white unit pixel PW may include a plurality of white sub-pixels W. The unit pixel P may include a red sub-pixel R, a green sub-pixel G, and a blue sub-pixel B.

The other partial display panels included in the tiled display apparatus may be substantially the same as the partial display panel 100B.

Alternatively, the display apparatus according to another exemplary embodiment may be a single display, not the part of the tiled display apparatus, although not shown.

Figure 10:
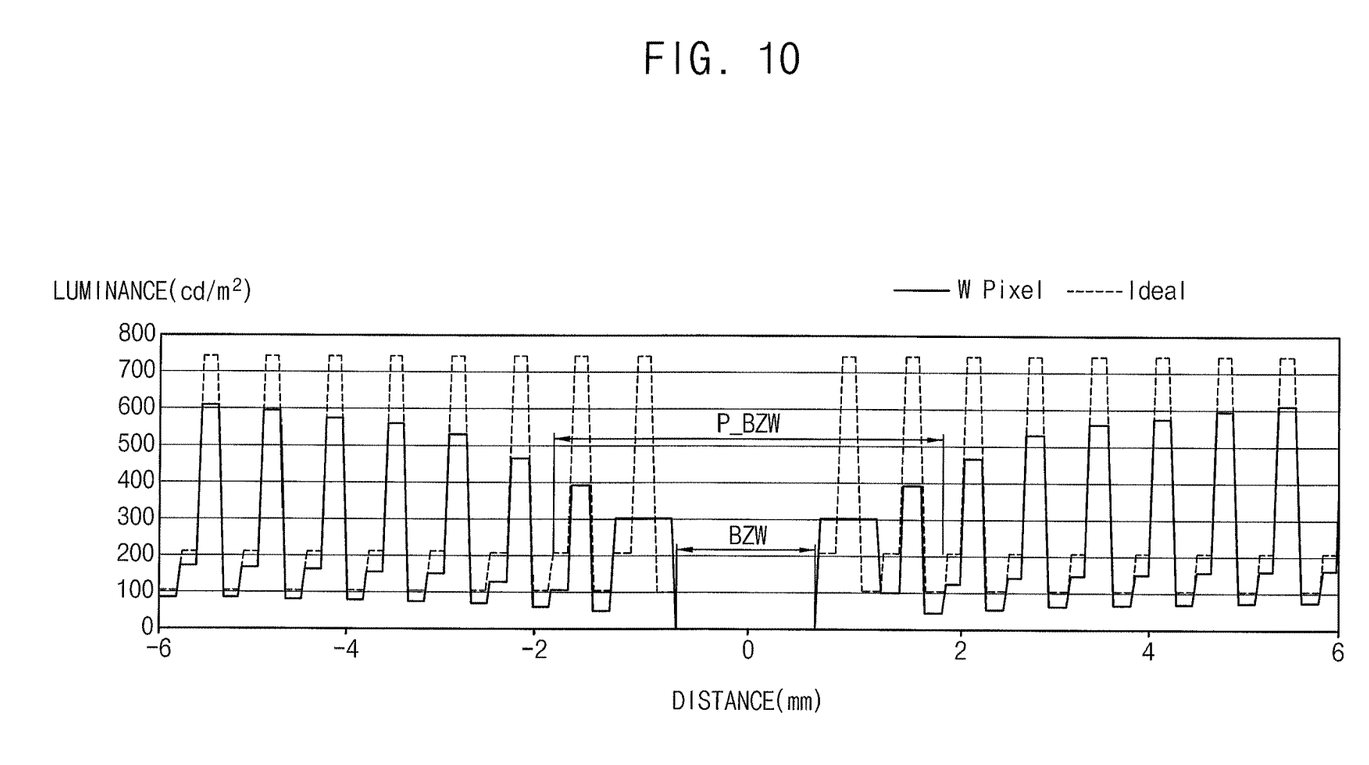
FIG. 10 is a graph illustrating an exemplary embodiment of a luminance of outermost white pixels of a display apparatus according to the inventive concept.

FIG. 10 is a graph illustrating an exemplary embodiment of a luminance of outermost white pixels of a display apparatus according to the inventive concept. Hereinafter, any repetitive explanation concerning FIGS. 4 through 6 will be omitted.

Specifically, FIG. 10 is a graph that represents luminance per pixel in an edge of a display panel when a white image having 255 grayscale as its luminance is displayed on the display panel. FIG. 10 includes luminance graphs when a method for compensating decreased luminance according to the invention is applied (W Pixel) and other luminance graph (Ideal) in an ideal case.

Referring to FIGS. 1, 4, 5, 6, 8, 9, and 10, in the ideal case (Ideal), the luminance per pixels are uniform in the edge of the partial display panel 100B. However, the luminance per pixels decreases toward to the edge of the partial display panel 100B before applying the method for compensating decreased luminance according to the exemplary embodiment in a real case ("As-Is" illustrated in FIG. 6). The luminance of the pixel in the outermost of the partial display panel 100B increases when the method for compensating decreased luminance according to this exemplary embodiment (W Pixel) of the invention is applied as illustrated in FIG. 10.

In other exemplary embodiments, the timing controller 200 may compensate the input image data RGB corresponding to the white unit pixel PW and the input image data RGB corresponding to the unit pixel P using different methods.

Considering the decreasing ratio of luminance, the timing controller 200 may compensate the input image data RGB corresponding to the white unit pixel PW to have a luminance corresponding to the target luminance of the unit pixel P corresponding to the white unit pixel PW.

In an exemplary embodiment, for example, suppose that a ratio of luminance of the red, green, blue, and white sub-pixels is 2:7:1:10, all of the grayscales of the input image data RGB corresponding to the white unit pixel PW are 255, and the target luminance of the unit pixel P corresponding to the white unit pixel PW is 10, the luminance of the white unit pixel PW may be 30. In this case, the timing controller 200 may compensate the input image data RGB corresponding to the white unit pixel PW to allow the luminance of the white unit pixel PW to be 10, considering the decreasing ratio of luminance.

The timing controller 200 may also apply the method for compensating decreased luminance of FIG. 4 or 5 to the input image data RGB corresponding to the unit pixel P.

The perception bezel width P_BZW(As-Is) of a display apparatus model is 2.68 mm when the method for compensating decreased luminance according to this exemplary embodiment of the invention is not applied. However, the perception bezel width P_BZW may decrease to 1.46 mm when the method for compensating decreased luminance according to this exemplary embodiment of the invention is applied. That is, the perception bezel width decreases by 1.22 mm.

A yellow unit pixel may be used instead of the white unit pixel PW in another exemplary embodiment (not shown). The yellow unit pixel may include a plurality of yellow sub-pixels.

According to this exemplary embodiment of the invention, the display apparatus has the white unit pixels PW in the outermost pixels instead of the unit pixels P. Therefore, the display apparatus may compensate the decrease of luminance in the edge of the partial display panel even in the case that the maximum grayscale is displayed since there is a margin in luminance to increase when the maximum grayscale is displayed. Thus, the bezel width may decrease.

The foregoing is illustrative of the inventive concept and is not to be construed as limiting thereof. Although a few exemplary embodiments of the inventive concept have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A display apparatus comprising:
    a display panel which includes a plurality of unit pixels to display an image
    a driver which receives an input image data RGB, generates a compensation image data $RGB_D$ by compensating the input image data RGB;
        wherein the compensation image data $RGB_D$ is determined according to an equation $RGB_D=RGB*D$;
            wherein $D=(100/(\text{decreasing ratio of luminance}))^{1/\alpha}$, wherein $\alpha$ is a gamma value, and decreasing ratio of luminance=(real luminance/target luminance)*100; and
    a final image data is generated by comparing the compensation image data $RGB_D$ to a maximum grayscale, and the image is displayed based on the final image data.

2. The display apparatus of claim 1, wherein the decreasing ratio of luminance decreases toward an edge of the display panel.

3. The display apparatus of claim 1, wherein the decreasing ratio of luminance varies depending on a corresponding unit pixel of the plurality of unit pixels.

4. The display apparatus of claim 3, wherein the decreasing ratios of luminance for sub-pixels included in the unit pixel are the same.

5. The display apparatus of claim 4, wherein the driver determines whether a highest grayscale of a red grayscale, a green grayscale, and a blue grayscale of the compensation image data is greater than the maximum grayscale, generates the final image data by multiplying each of the grayscales of the compensation image data by the maximum grayscale and dividing each of the grayscales of the compensation image data by the highest grayscale when the highest grayscale is greater than the maximum grayscale, and provides the compensation image data as the final image data when the highest grayscale is equal to or less than the maximum grayscale.

6. The display apparatus of claim 3, wherein the decreasing ratios of luminance for sub-pixels included in the unit pixel are different from each other.

7. The display apparatus of claim 6, wherein the driver determines whether the compensation image data corresponding to each of sub-pixels included in the unit pixel is greater than the maximum grayscale, generates the final image data, corresponding to a first sub-pixel included in the unit pixel, having the maximum grayscale when the compensation image data corresponding to the first sub-pixel is greater than the maximum grayscale, and provides the compensation image data corresponding to a second sub-pixel included in the unit pixel as the final image data corresponding to the second sub-pixel when the compensation image data corresponding to the second sub-pixel is equal or less than the maximum grayscale.

8. The display apparatus of claim 1, wherein the unit pixels disposed in an outermost of the display panel are white unit pixels that include white sub-pixels.

9. The display apparatus of claim 8, wherein when remainder unit pixels of the plurality of unit pixels are general unit pixels that include red, green, and blue sub-pixels.

10. The display apparatus of claim 9, wherein the driver compensates a grayscale of the input image data corresponding to the white unit pixels to decrease the grayscale of the input image data.

11. The display apparatus of claim 10, wherein the driver compensates the input image data corresponding to the white unit pixel based on a decreasing ratio of luminance of the white unit pixel to emit a target luminance of the general unit pixel corresponding to the white unit pixel.

12. The display apparatus of claim 1, wherein the maximum grayscale is 255 grayscale.

13. The display apparatus of claim 1, wherein the input image data is a red grayscale, a green grayscale, and a blue grayscale corresponding to the unit pixel.

14. A display apparatus comprising:
    a partial display panel which includes a plurality of partial display devices to display an image;
    wherein screens of the partial display panel are arranged in a tile shape,
    wherein bezels are disposed between the screens;
    wherein each of the partial display devices includes:
        a driver which receives an input image RGB, generates a compensation image data $RGB_D$ by compensating the input image data RGB:
            wherein the compensation image data $RGB_D$ is determined according to an equation $RGB_D=RGB*D$;
            wherein $D=(100/(\text{decreasing ratio of luminance}))^{1/\alpha}$, wherein $\alpha$ is a gamma value, and decreasing ratio of luminance=(real luminance/target luminance)*100; and
        a final image data is generated by comparing the compensation image data $RGB_D$ to a maximum grayscale, and the image is displayed based on the final image data.

15. A method of driving a display apparatus, the method comprising:
    receiving an input image data RGB;
    generating a compensation image data $RGB_D$ by compensating the input image data RGB;
        wherein the compensation image data $RGB_D$ is determined according to an equation $RGB_D=RGB*D$;
        wherein $D=(100/(\text{decreasing ratio of luminance}))^{1/\alpha}$, wherein $\alpha$ is a gamma value, and decreasing ratio of luminance=(real luminance/target luminance)*100;
    generating a final image data by comparing the compensation image data $RGB_D$ to a maximum grayscale; and
    displaying an image based on the final image data.

16. The method of claim 15, wherein the display apparatus includes a plurality of unit pixels, and
    wherein the decreasing ratios of luminance corresponding to the unit pixels are different from each other.

17. A display apparatus comprising:
    a display panel which includes white unit pixels having white sub-pixels and general unit pixels having red, green, and blue sub-pixels, wherein the white unit pixels are disposed in an outermost of the display panel, wherein the general unit pixels are disposed in a remainder part of the display panel except the outermost of the display panel; and a driver which compensates an input image data corresponding to the white unit pixels to decrease the grayscale of the input image data.

18. The display apparatus of claim 17, wherein the driver compensates the input image data corresponding to the general unit pixels in order to compensate a luminance decrease of the general unit pixels.

\* \* \* \* \*